United States Patent

Wagner

[15] 3,635,578

[45] Jan. 18, 1972

[54] VISCOUS PUMP FOR UNITIZED BEARING LUBRICATION SYSTEM

[72] Inventor: James B. Wagner, Lynn, Mass.

[73] Assignee: General Electric Company

[22] Filed: Apr. 16, 1970

[21] Appl. No.: 29,125

[52] U.S. Cl. .................................. 415/90, 101/157, 308/127
[51] Int. Cl. ......................................................... F01d 1/36
[58] Field of Search ............. 415/90; 308/127; 101/157, 169, 101/208

[56] References Cited

UNITED STATES PATENTS

| | | | |
|---|---|---|---|
| 3,396,664 | 8/1968 | Smith | 415/90 |
| 3,198,113 | 8/1965 | Feller | 415/90 UX |
| 2,351,431 | 6/1944 | Irons | 415/90 |
| 1,496,849 | 6/1924 | Howarth | 308/127 |
| 1,919,138 | 7/1933 | Wake | 308/127 |
| 2,730,297 | 1/1956 | Van Dorsten et al. | 415/90 |

Primary Examiner—C. J. Husar
Attorney—William C. Crutcher, Bryan C. Ogden, Frank L. Neuhauser, Oscar B. Waddell and Joseph B. Forman

[57] ABSTRACT

An individual lubrication system for a bearing with a viscous pump, gravity feed tank and heat exchanger integrated within the bearing housing. The viscous pump scraper serves to support the viscous pump casing from a universal connection so that hydrodynamic alignment between the casing and the pump disk is maintained for high-speed pumping.

4 Claims, 6 Drawing Figures

INVENTOR:
JAMES B. WAGNER,
BY W. C. Crutcher
HIS ATTORNEY.

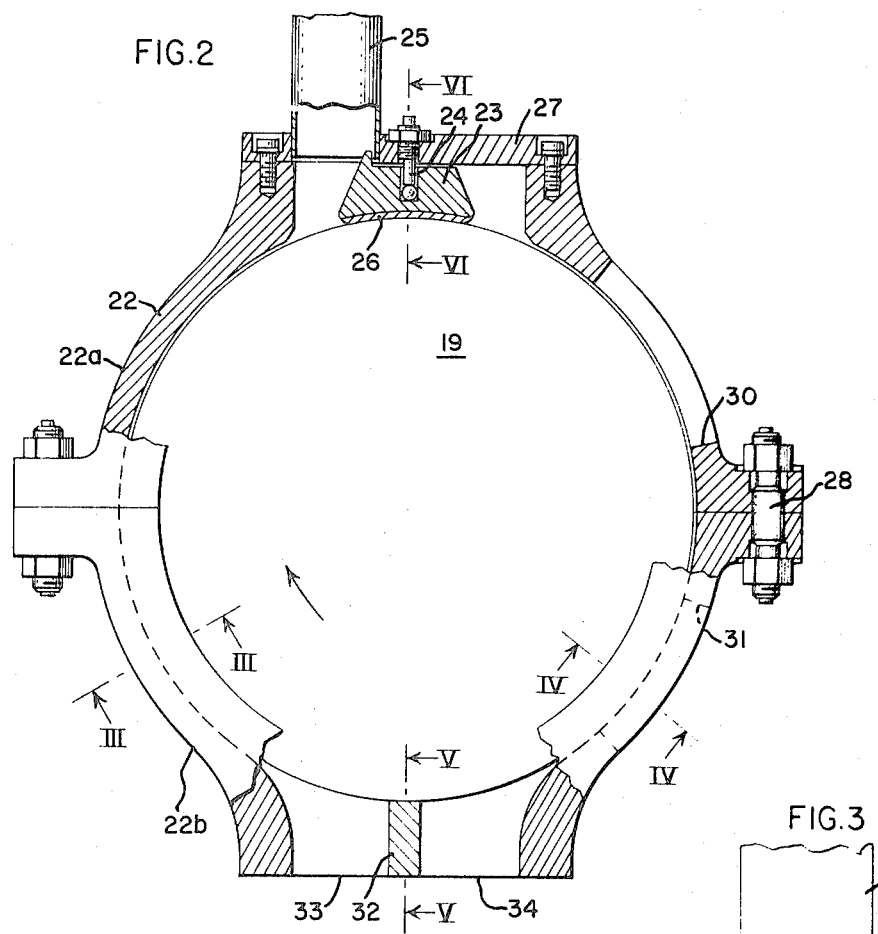
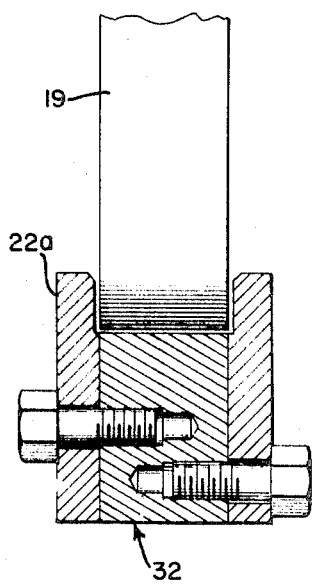
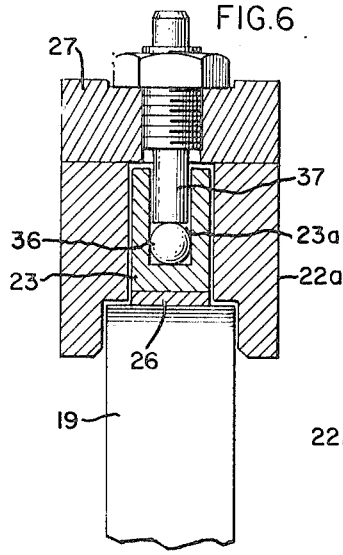

3,635,578

VISCOUS PUMP FOR UNITIZED BEARING LUBRICATION SYSTEM

BACKGROUND OF THE INVENTION

This invention relates generally to an integrated viscous pump and gravity feed bearing lubrication system, and more particularly to improvements in the viscous pump casing and scraper construction.

Conventional lubrication systems for large rotating equipment such as turbine-generators have employed a central pump with pipes leading to the various bearings to provide a flow of lubricating oil to the bearings. There has been a need for a simple means to lubricate each bearing separately without the need for extensive piping to and from a central pump and heat exchanger.

It has been suggested in the prior art in U.S. Pat. No. 3,396,664 issued to R. J. Smith on Aug. 13, 1968 that a viscous pumping disk can be used to transfer lubricating oil from a sump in the bottom of a bearing housing to a gravity feed tank which provides a flow of oil to the bearing journal. In the Smith patent, a spring-loaded scraper was used to maintain small clearances between the scrapers and a rotating viscous ring. An intermediate ring rotating at half speed was used between the viscous pumping disk and the pump casing to provide laminar flow between the disk and the ring and between the ring and the casing. Improved constructions have been sought which would insure pumping capability without turbulence or flow separation of the lubricating oil from the disk at high disk speeds.

Since the principle of a viscous pump is dependent upon the ability of the disk to pick up lubricating oil in the bottom of the casing by viscous drag and to carry it to the scraper at the uppermost part of the disk, the clearances between disk and its casing are of vital concern in maintaining the proper hydrodynamic relationships. Proper scraper pressure must be maintained so that undue scraper wear is not experienced and the oil is removed properly from the disk.

Accordingly, one object of the present invention is to provide an improved scraper and casing support structure for a viscous drag pump.

Another object of the invention is to provide an improved unitized bearing lubrication construction wherein a viscous pump is incorporated in the bearing housing to operate at shaft speed with a minimum of turbulence or flow separation of the lubricating fluid.

DRAWING

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing, in which:

FIG. 1 is a horizontal elevation drawing, partly in section, showing the complete unitized bearing lubrication system, FIG. 2 is an end view of the viscous pump assembly, taken along lines II—II of FIG. 1, and FIGS. 3, 4, 5 and 6 are cross sections taken at various points through the viscous pump assembly of FIG. 2 as indicated by arrows III—III, IV—IV, V—V, and VI—VI respectively.

SUMMARY OF THE INVENTION

Briefly stated, the invention is practiced by disposing a viscous pump assembly with the bearing assembly in a common housing with a gravity feed tank in the upper part of the housing and a heat exchanger in the lower part of the housing. The viscous pump casing and feed tube are supported via a universal support directly upon a scraper which in turn rests upon the viscous pumping disk. The casing therefore can follow movements of the shaft. The universal support provides for small aligning motions of the casing relative to the disk without varying scraper pressure or orientation of the scraper. These movements are effected by the hydrodynamic pressures generated by the pumped fluid.

DESCRIPTION OF THE PREFERRED EMBODIMENT

Figure 1:
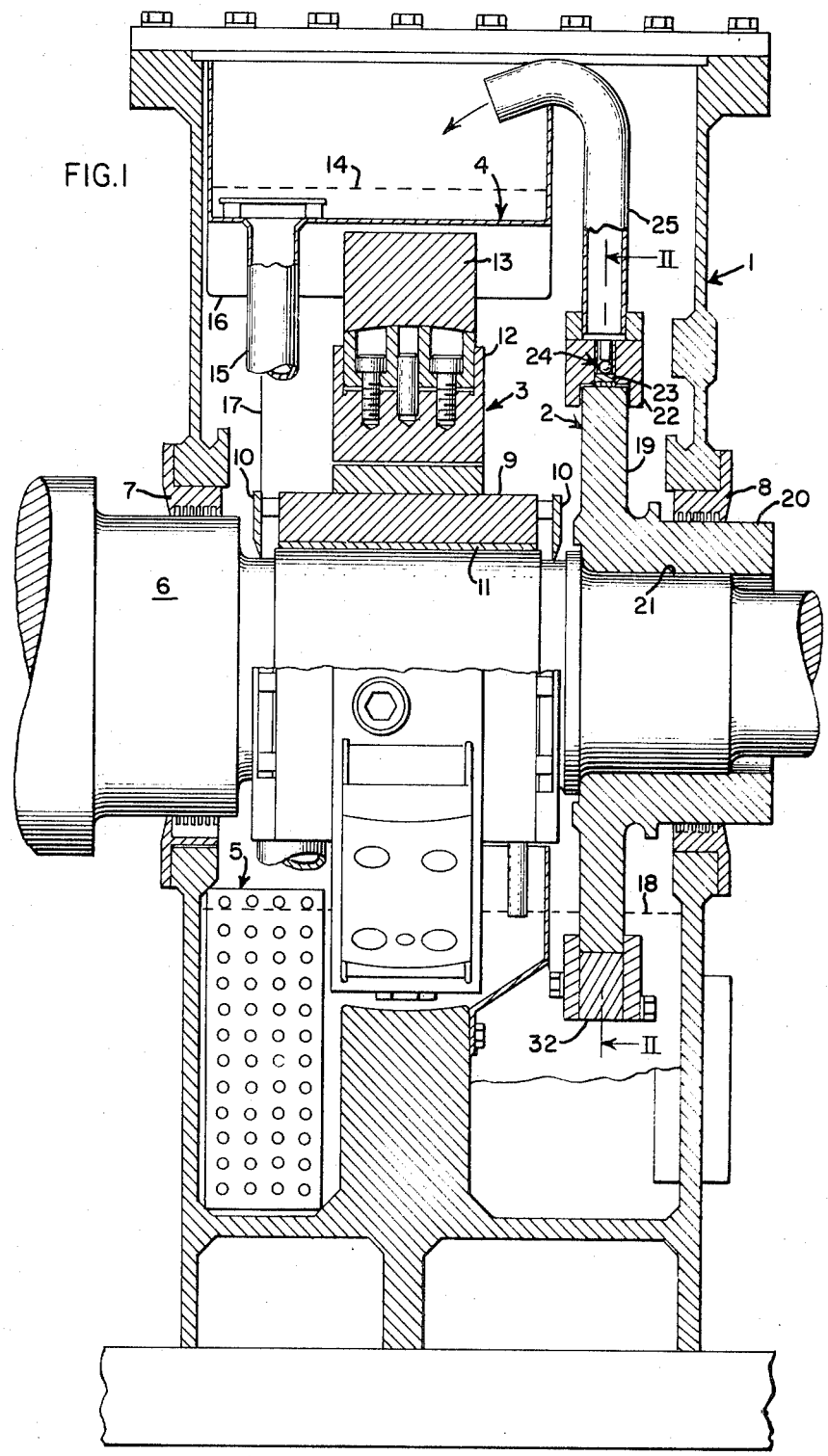

Referring now to FIG. 1 of the drawing, a common housing, shown generally as 1, includes a viscous pump assembly 2, a bearing assembly 3, a gravity feed lubricating oil tank 4 in the top of housing 1, and a heat exchanger 5 in the bottom of housing 1. A rotatable shaft 6 extends through the housing and labyrinth seals 7, 8 prevent the escape of liquid or vapor.

The construction of the bearing assembly 3 is conventional. A bearing journal sleeve 9 with attached oil deflectors 10, has a lining 11 with internal grooves (not shown) connected to an oil supply pipe (not shown). The sleeve 9 is supported within a split casing 12 which in turn is held within a pillow block support 13 in conventional fashion.

The gravity feed tank 4, which has a level maintaining weir (not shown) maintaining an oil level 14, has an oil outlet pipe 15 connected with the aforementioned pipe supplying oil to the bearings in a conventional manner. Tank 4 also has an overflow chamber 16 from which excess oil is circulated through an overflow pipe 17 to the bottom of housing 1.

A heat exchanger 5 is submerged in the lubricating oil in the bottom of the chamber to provide constant cooling of the oil. The oil level is indicated at 18.

Referring to the viscous pump assembly, a rotating disk 19 is attached to the shaft by means of an integral hub shrunk onto shaft 6 at 21, although disk 19 could be made integral with the shaft. The pump casing 22 is supported on the scraper 23 by a universal support comprising a ball and pin, or equivalent universal arrangement, indicated at 24. A pump discharge tube 25 carries fluid removed by scraper 23 to the gravity feed tank 4.

The details of the viscous pump, casing and scraper assembly are more clearly seen by reference to the partial sectional end view of FIG. 2. As indicated there, the scraper 23 rests on the periphery of disk 19 on a bearing pad 26. A cap 27 rests on the scraper 23 by way of the universal support 24 which will be more particularly discussed later in connection with FIG. 6.

The casing 22 is made up of upper and lower halves 22a, 22b, which are attached together at a horizontal joint by threaded connectors 28. The cap 27 is connected to the upper casing half 22a and also supports the discharge tube 25.

Other features of the casing include relief slots 30, 31 on the inactive side of the casing beyond the scraper. A stationary dam 32, which could alternatively serve as a bottom scraper, serves to separate the pump inlet 33 and an excess fluid outlet 34. Various other features of the casing configuration may be seen by reference to FIGS. 3–6 which are cross sections as indicated in FIG. 2.

FIG. 3 illustrates the casing and disk interface on the active or pumping side, i.e., between inlet 33 at the bottom and scraper 23 at the top. The casing includes a feed slot 35 defining a clearance between the casing and the disk through which the major quantity of lubricating oil is transported from the bottom to the top of the pump casing.

FIG. 4 shows a relief slot section on the inactive or nonpumping side, i.e., between the scraper 23 and the excess fluid outlet 34. The casing wall relief slots 30, 31 relieve hydrodynamic pressures between the disk and casing due to any excess fluid which is transported downward toward the outlet 34. This excess fluid is deflected by dam 32, or bottom scraper, so that there will be no interference with fluid pickup at inlet 33.

Referring now to FIG. 6, which particularly illustrates the novel support assembly, scraper 23 has a cylindrical recess 23a in which is disposed a ball 36. A pin 37 is screwed into the cap 27 and rests on the ball. Slight clearances are provided around the pin and around the scraper so that small universal movements may take place, which are greatly magnified in terms of possible casing alignments with respect to the disk 19 as should be apparent from a consideration of FIG. 2 of the drawing. Selfnaligning spherical seats could also be used in place of the ball.

OPERATION

The operation of the invention will be apparent from the following description. Oil is picked up by viscous drag in adhering to the disk 19 as it passes through the cooled oil in the bottom of the bearing housing 1. The oil is transported from the bottom to the top of the assembly in the passage afforded by feed slot 35 shown in FIG. 3 until it contacts the scraper 23. Thereupon it is sheared off of the disk and the dynamic pressure head causes the oil to flow upward through the discharge pipe 25 into the gravity feed tank 4. Thereafter, it passes downward through pipe 15 to the bearing. Bearing discharge oil, as well as recirculated excess oil discharged through pipe 17, is cooled by the heat exchanger 5 and recirculated to the viscous pump inlet.

It is particularly to be noted that the entire support of the viscous pump casing 22 and feed pipe 25 is via the universal connection 24 and scraper 23. The scraper pressure is due to the weight of these parts on the scraper and hence constant pressure is afforded.

The universal connection 24 permits small movements of the casing with respect to the disk so that the scraper can always contact the disk at the correct angle and with constant pressure.

The foregoing described construction of the pump casing and feed pipe support assembly on the scraper by means of a universal connector provides an exceedingly simple and compact means for incorporating a viscous pump lubrication feed in a bearing housing. The universal connector prevents misalignment or binding and by the fact that constant pressure is always present on the scraper, it has been possible to increase the pumping capacity of a viscous pump at high speeds without significant turbulence or flow separation which has accompanied prior art pumps of this type.

While there has been described herein what is considered to be the preferred embodiment of the invention, other modifications will occur to those skilled in the art, and it is intended to cover in the appended claims all such modifications as fall within the true spirit and scope of the invention.

What is claimed as new and desired to secure by Letters Patent of the United States is:

1. A viscous pump assembly comprising:
   a reservoir of viscous fluid,
   a rotating disk communicating at its lower edge with said fluid,
   a scraper member disposed on the top of said disk and having a surface resting on the disk peripheral surface,
   a casing loosely surrounding the disk periphery and defining an inlet to the disk within said viscous fluid, and
   universal support means adapted to carry the weight of said casing from said scraper and permitting universal relative movements between casing and scraper.

2. The combination according to claim 1, wherein said universal support means comprises a pin attached to the casing and extending downwardly to rest upon a ball carried within said scraper member.

3. The combination according to claim 1, wherein said casing defines a feed slot opposite the disk periphery between said casing inlet and the scraper on the active side where the disk is traveling upward, and wherein said casing wall defines relief slots through the casing wall opposite the disk periphery on the inactive side of the casing where the disk is traveling downward, whereby pressure relief of excess fluid is provided.

4. A viscous pump assembly comprising:
   a reservoir of viscous fluid,
   a rotating disk communicating at its lower edge with said fluid,
   a scraper member disposed on the top of said disk and having a bearing surface resting on the disk peripheral surface, said scraper also defining a recess with a ball disposed therein,
   a nonrotating casing loosely disposed about the disk, said casing having a first arcuate wall portion defining a feed groove opposite the disk periphery for containing viscous fluid transported upwardly to the scraper, and further having a second arcuate wall portion defining relief slots therethrough for relieving pressure of excess fluid as the disk travels downwardly,
   a cap member connected between the first and second wall portions to define a chamber containing said scraper member, said cap member having a pin extending downwardly into said scraper recess and adapted to support the casing from said scraper while permitting small universal aligning movements.

* * * * *